US006816436B1

(12) United States Patent
Bachert

(10) Patent No.: US 6,816,436 B1
(45) Date of Patent: Nov. 9, 2004

(54) METHOD FOR ECHO PROCESSING IN TIME-OF-FLIGHT OR LEVEL MEASUREMENT SYSTEMS

(75) Inventor: Darcy Bachert, Ajax (CA)

(73) Assignee: Siemens Milltronics Process Instruments Inc., Peterborough, Ontario (CA)

( * ) Notice: Subject to any disclaimer, the term of this patent is extended or adjusted under 35 U.S.C. 154(b) by 0 days.

(21) Appl. No.: 10/444,055

(22) Filed: May 21, 2003

(51) Int. Cl.[7] ............................................. G01S 15/08
(52) U.S. Cl. ....................................... 367/99; 367/908
(58) Field of Search ........................ 367/99, 124, 127, 367/908

(56) References Cited

U.S. PATENT DOCUMENTS 5,793,704 A * 8/1998 Freger ........................ 367/908
6,122,602 A * 9/2000 Michalski et al. ............ 367/99
6,169,706 B1 * 1/2001 Woodward et al. ........... 367/99
6,621,763 B2 * 9/2003 Lyon ............................ 367/99

* cited by examiner

Primary Examiner—Ian J. Lobo
(74) Attorney, Agent, or Firm—Townsend and Townsend and Crew LLP

(57) ABSTRACT

A method for processing echoes in a time-of-flight ranging system or level measurement system. The method comprises an initial noise floor level and identifying potential echoes in an echo signal above the initial noise floor level and a noise signal below the initial noise floor level. One or more portions of the initial noise floor level are modified and an adjusted noise floor level is generated by applying a cubic spline algorithm to the modified portions and the initial noise floor level. The adjusted noise floor level is then used to identify valid echoes in the echo signal and generate an echo signal profile.

7 Claims, 9 Drawing Sheets

FIG. 4

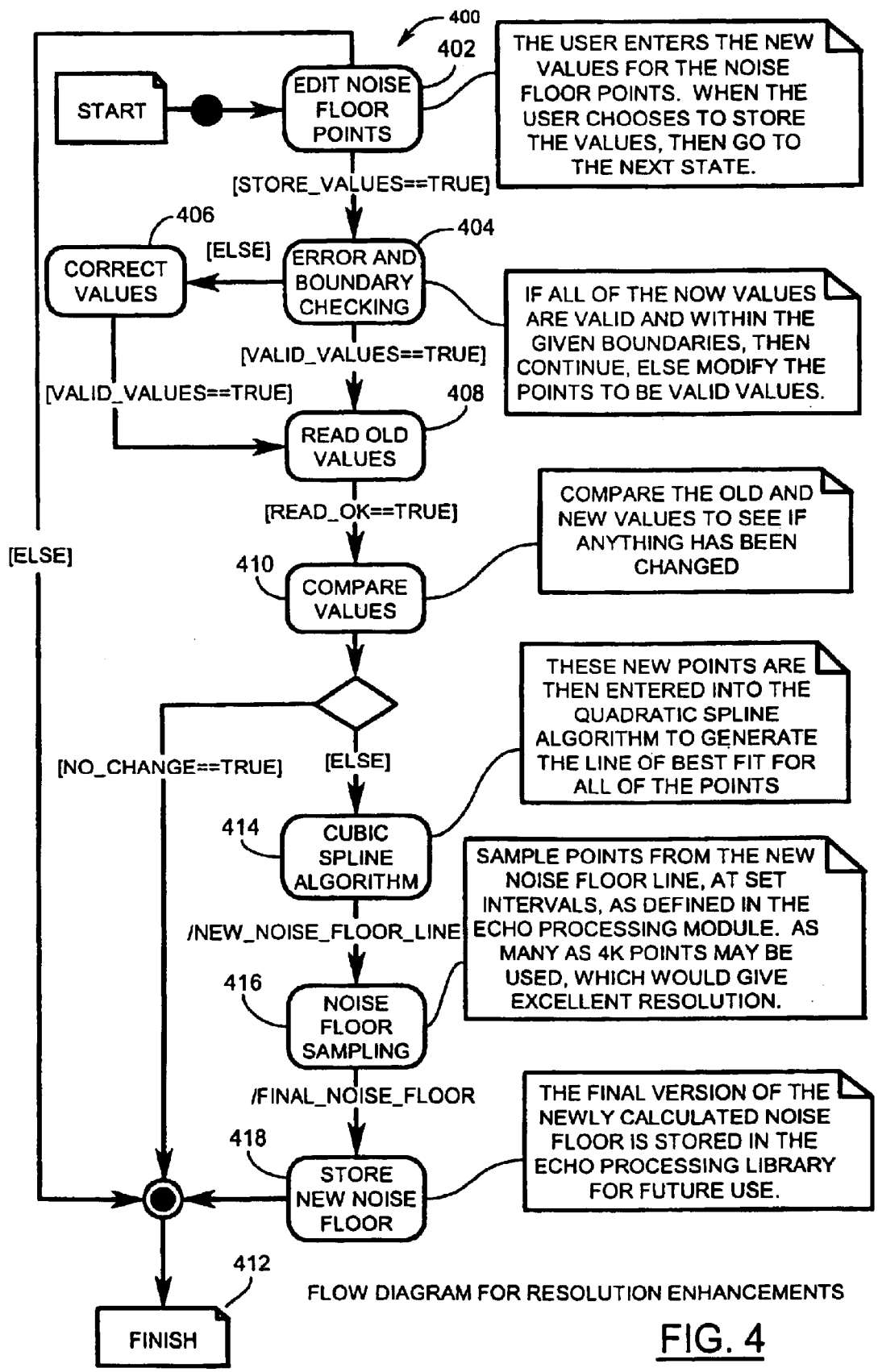
FIG. 4 — FLOW DIAGRAM FOR RESOLUTION ENHANCEMENTS

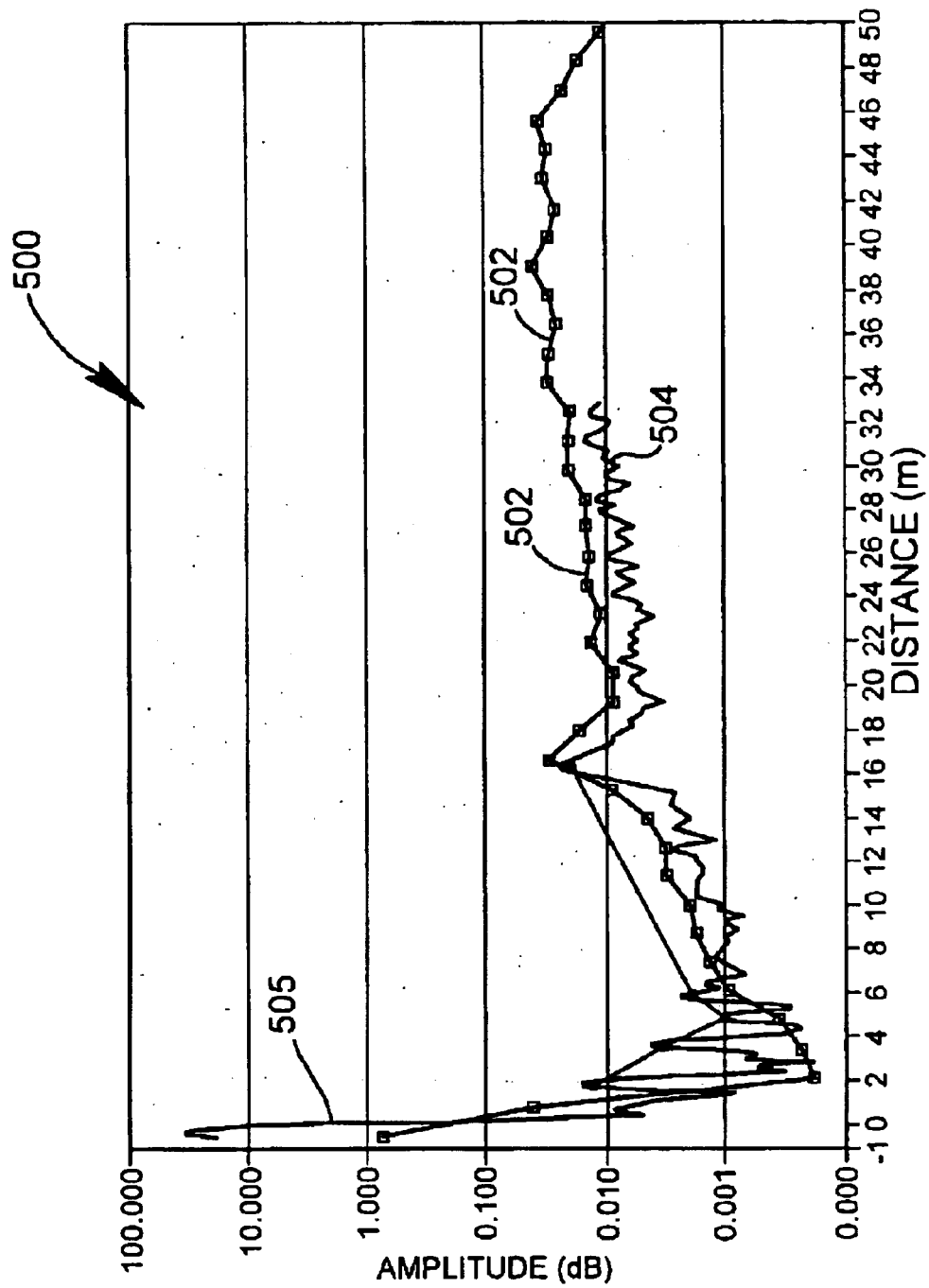

FIG. 7 INPUT DATA ARRAY

| POINT | DISTANCE (m) | VALUE (dB) |
|---|---|---|
| 1 | 0.80 | 0.0349 |
| 2 | 2.12 | 0.0251 |
| 3 | 3.44 | 0.0100 |
| 4 | 4.76 | 0.0004 |
| 4 | 6.08 | 0.0009 |

FIG. 8 OUTPUT COEFICIENT DATA ARRAY

| EQUATION | START DISTANCE (m) | DISTANCE (m) | VALUE (dB) | A | B | C | D |
|---|---|---|---|---|---|---|---|
| 1 | 0.80 | 2.12 | 0.0349 | .3 | -.5 | .2 | 0.01 |
| 2 | 2.12 | 3.44 | 0.0251 | .4 | -.8 | .1 | 0.03 |
| 3 | 3.44 | 4.76 | 0.0100 | -.6 | 1.3 | -.3 | 0.002 |

FIG. 9 OUTPUT DATA ARRAY

| POINT | DISTANCE (m) | VALUE (dB) |
|---|---|---|
| 1 | 0.80 | 0.0349 |
| 2 | 1.24 | 0.0312 |
| 3 | 1.68 | 0.0289 |
| 4 | 2.12 | 0.0251 |
| 5 | 2.56 | 0.0193 |
| 6 | 3.00 | 0.0151 |
| 7 | 3.44 | 0.0100 |
| 8 | 3.88 | 0.0089 |
| 9 | 4.32 | 0.0015 |
| 10 | 4.76 | 0.0004 |
| 11 | 5.20 | 0.0005 |
| 12 | 5.64 | 0.0007 |
| 13 | 6.08 | 0.0009 |
| 14 | 6.52 | 0.0010 |
| 15 | 6.96 | 0.0012 |

ORIGINAL DATA POINTS

MODIFIED DATA POINTS

METHOD FOR ECHO PROCESSING IN TIME-OF-FLIGHT OR LEVEL MEASUREMENT SYSTEMS

FIELD OF THE INVENTION

The present invention relates to signal processing, and more particularly to a method for echo processing in level measurement or time of flight ranging systems.

BACKGROUND OF THE INVENTION

Pulse-echo acoustic ranging systems, also known as time-of-flight ranging systems, are commonly used in level measurement applications. Pulse-echo acoustic ranging systems determine the distance to a reflector (i.e. reflective surface) by measuring how long after transmission of a burst of energy pulses the echoes or reflected pulses are received. Such systems typically use ultrasonic pulses or pulsed radar or microwave signals.

Pulse-echo acoustic ranging systems generally include a transducer and a signal processor. The transducer serves the dual role of transmitting the energy pulses and receiving the reflected energy pulses or echoes. The signal processor is for detecting and calculating the distance or range of the object based on the transmit times of the transmitted energy pulses and the reflected energy pulses or echoes.

Since the reflected energy pulses or echoes are converted into distance measurements, any errors in the echoes result in distance measurement errors which degrade the accuracy of the level measurements.

Accordingly, there remains a need to provide a system and techniques which improve the processing of the reflected energy pulses or echoes.

BRIEF SUMMARY OF THE INVENTION

The present invention provides a method for improved echo processing, and comprises a method for generating a new noise level signal which is based on the original noise level and any changed or modified portions.

In a first aspect, the present invention provides a method for generating an echo profile in a time-of-flight ranging system, said method comprising the steps of: (a) transmitting a transmit burst of energy to a reflective surface; (b) receiving reflected pulses from said reflective surface, and converting said reflected pulses into an echo signal; (c) establishing an initial noise floor level; (d) identifying one or more portions of said echo signal above said initial noise floor level as having potential echoes; (e) modifying one or more segments in said initial noise floor level, and generating an adjusted noise floor level; (f) wherein said step of generating comprises applying a cubic spline procedure to said modified segments and said initial noise floor level; (g) identifying valid echoes in the portions of said echo signal above said adjusted noise floor level; and (h) generating an echo profile using said identified valid echoes.

In a further aspect, the present invention provides a method for generating a noise floor level for an echo profile in a time of flight ranging system, said method comprising the steps of: (a) establishing an initial noise floor level; (b) modifying one or more points in said initial noise floor level; (c) applying a cubic spline algorithm to said modified points and said initial noise floor level to generate a plurality noise floor data points; (d) sampling said noise floor data points; (e) forming an adjusted noise floor level from said sampled noise floor data points.

In yet another aspect, the present invention provides a method for generating an echo profile in a time-of-flight ranging system, said method comprising the steps of: (a) transmitting a transmit burst of energy to a reflective surface; (b) receiving reflected pulses from said reflective surface, and converting said reflected pulses into an echo signal; (c) establishing an initial noise floor level; (d) subtracting said initial noise floor level from said echo signal to identify one or more potential echoes; (e) modifying one or more segments in said initial noise floor level, and generating an adjusted noise floor level; (f) wherein said step of generating comprises applying a cubic spline procedure to said modified segments and said initial noise floor level; (g) subtracting said adjusted noise floor level from said echo signal to identify one or more valid echoes said echo signal; and (h) generating an echo profile using said identified valid echoes.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is next made to the accompanying drawings which show, by way of example, embodiments of the present invention and in which:

FIG. 4 is a flow chart showing a method for generating a noise floor level signal or waveform in accordance with the present invention;

FIG. 5(a) is an echo profile plot showing an initial noise floor level signal;

FIG. 7 shows in tabular form an input data array;

FIG. 8 shows in tabular form an output coefficient data array;

FIG. 9 shows in tabular form an output data array determined in accordance with the present invention;

DETAILED DESCRIPTION OF EMBODIMENTS OF THE INVENTION

Figure 1:
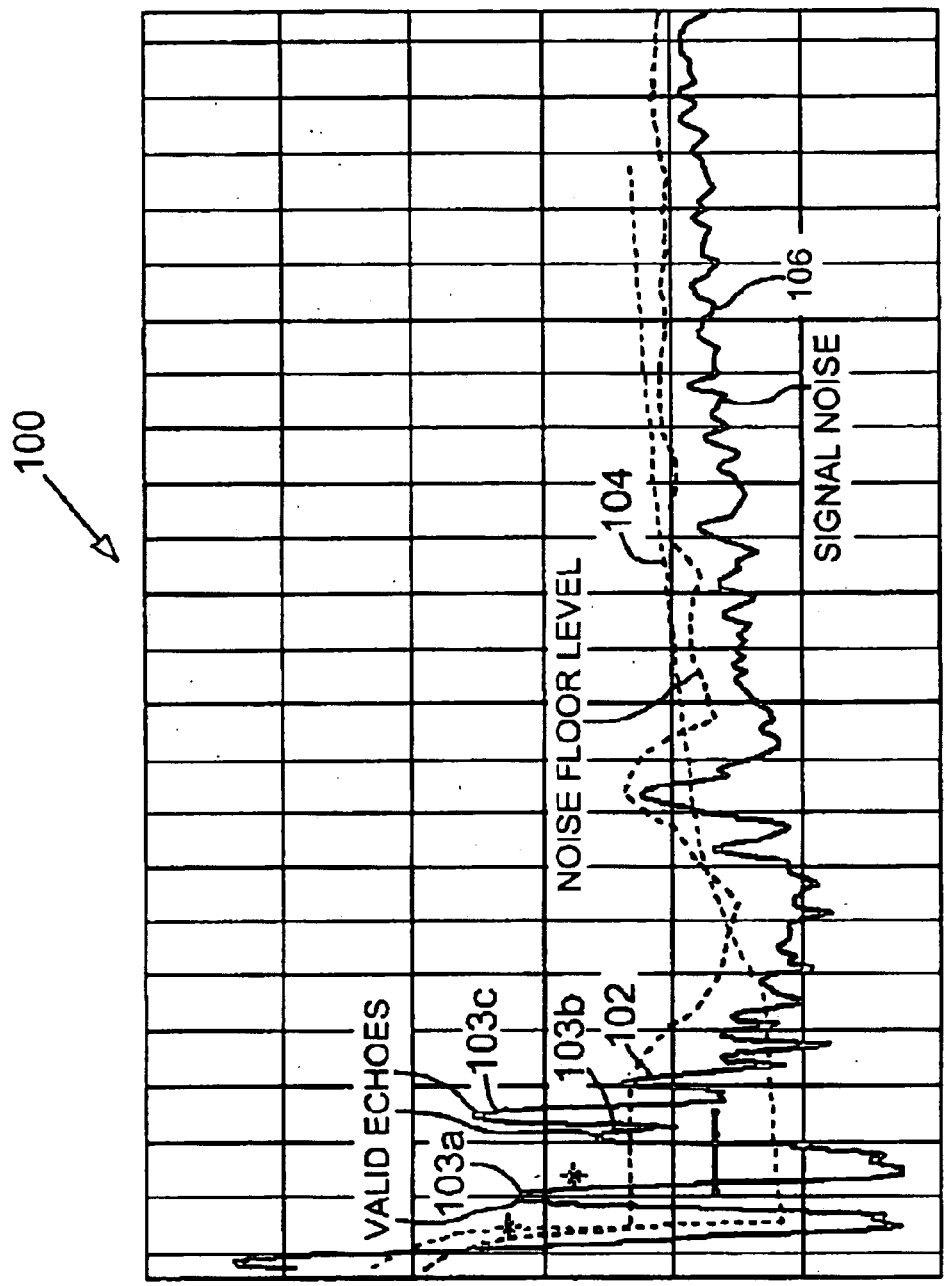
FIG. 1 is a graphic representation of an echo signal waveform, a noise floor level waveform and a noise signal waveform for a time-of-flight ranging system.

Reference is first made to FIG. 1 which shows in graphic form an echo profile plot indicated generally by reference 100. The echo profile plot 100 comprises a receive echo signal 102.

The echo signal 102 is generated in the operation of a level measurement device (i.e. a type of time-of-flight ranging system). In known manner, the level measurement device includes a transducer (e.g. ultrasonic, microwave or radar), a controller or signal processor unit, an analog-to-digital (A/D) converter, a transmitter, a receiver, and a power supply unit. The transducer emits a transmit pulse or energy burst directed at a surface to be measured. The surface reflects the transmit energy burst and the reflected energy pulses are coupled by the transducer and converted into electrical signals. The electrical signals are applied to the receiver and sampled and digitized by the A/D converter. The signal processor, for example a microprocessor operating under firmware control, takes the digitized output and generates the receive echo signal 102 having a form as shown in FIG. 1. The receive echo signal 102 is characterized by one or more valid echoes 103, indicated individually by references 103a, 103b, 103c, . . . 103n, and correspond to the reflected energy pulses. In known manner, the controller unit executes an algorithm which uses the receive echo signal 102 to calculate the range, i.e. the distance to the reflective surface, from the time it takes for the reflected energy pulse to travel from the reflective surface to the transducer. From this calculation, the distance to the surface of the liquid and thereby the level of the liquid is determined. The controller, e.g. microprocessor or microcontroller, is suitably programmed to perform these operations as will be within the understanding of those skilled in the art.

As will now be described in more detail, the subject invention is directed to a method or process for producing an improved receive echo signal 102 and echo profile.

Referring back to FIG. 1, the echo profile plot 100 also shows a noise floor level waveform 104, and a signal noise waveform 106. The noise floor waveform 104 is the level that determines where noise in the reflected energy pulses stops and valid echoes 103 begin. The signal noise waveform 106 is the part of the echo profile which does not represent valid echoes 103 or pulses, and is therefore not wanted for further processing. The signal noise waveform 106 represents signals which are generated by the transducer and/or receiver and need to be removed and controlled in order to achieve the best results for the receive echo signal 102. The receive echo signal 102 represents any echoes 103 which are considered to be valid. In this context, a valid echo is an echo 103 which is above the noise floor level 104.

The noise floor level 104 is calculated based on an initial state, and the noise floor level 104 is subtracted from the receive echo profile signal to determine the receive echo signal 102 and the valid echoes 103. However, the need frequently arises to modify the noise floor level 104 during operation of the level measurement system. As will be described in more detail below, the method according to one aspect of the invention takes the original noise floor level 104 and the changed portion(s) in the noise floor level 104 and generates a revised noise floor level which maintains and improves the accuracy of the echo signal 102 and the representation of valid echoes 103.

Figure 2:
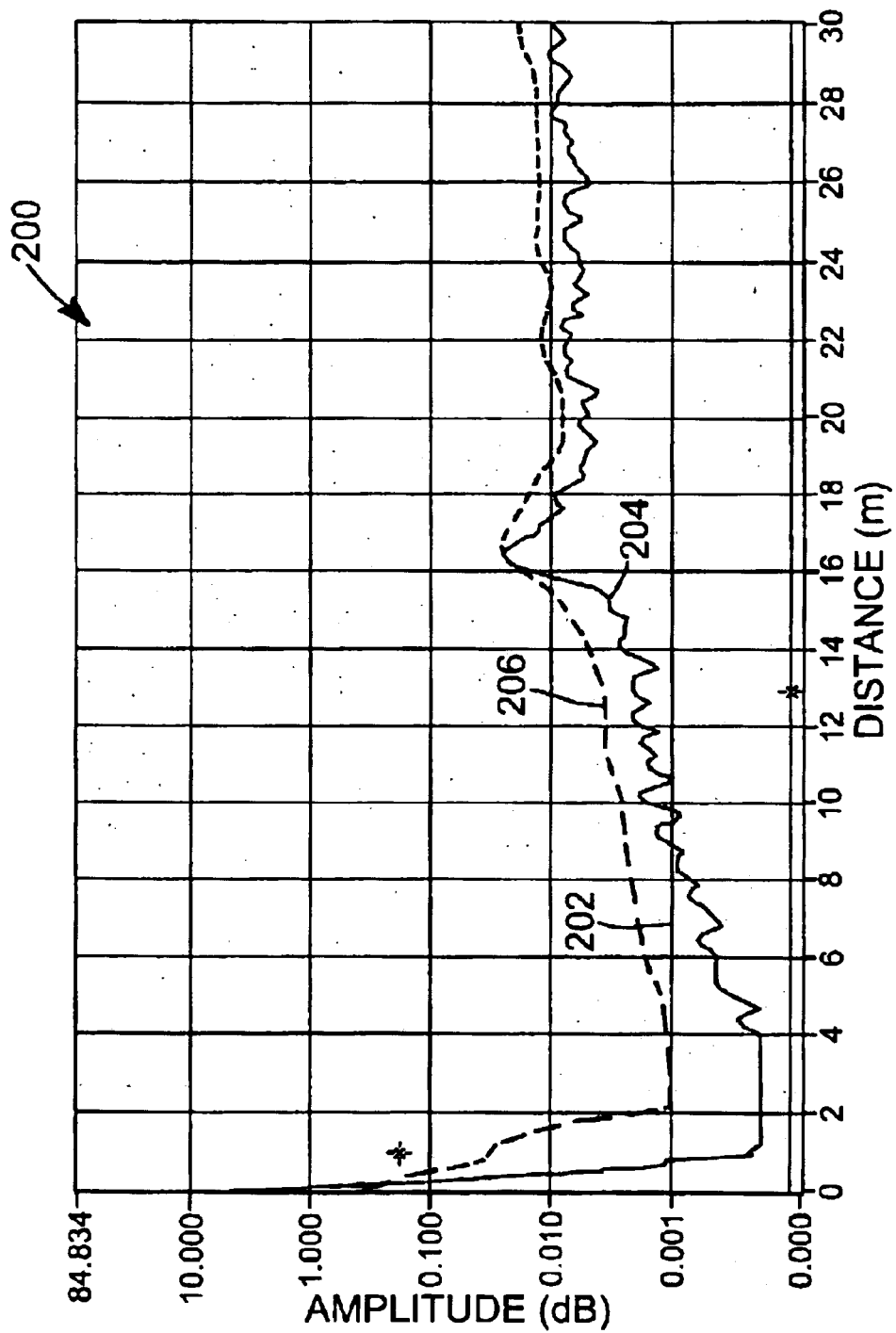
FIG. 2 is an echo profile plot showing a noise level waveform adjusted in accordance with the present invention.

Reference is made to FIG. 2, which shows an echo profile plot indicated by reference 200. The echo profile plot 200 represents an initial state, i.e. a state where only signal noise exists. The echo profile plot 200 comprises an initial noise floor level 202, a noise signal 204, and an adjusted noise floor level 206.

The echo profile plot 200 as depicted in FIG. 2 represents an initial state, i.e. a state where only signal noise exists, as depicted by the noise signal 202. The noise floor level 202 defines where echo signal noise, i.e. the noise signal 202, is separated from valid echoes. The noise signal 202 is the part of the echo signal 208 (FIG. 3) that has a lower amplitude than the noise floor level 202. The noise floor level 202 is used to generate the adjusted noise floor level 206. The adjusted noise floor level 206 can have a greater amplitude or a smaller amplitude than the initial noise floor level 202. As will be described in more detail below, if there are some valid echoes with large amplitudes, then the adjusted noise floor level 206 will increase, and if there are no valid echoes, the adjusted noise floor level 206 will decrease by a specified amount.

Figure 3:
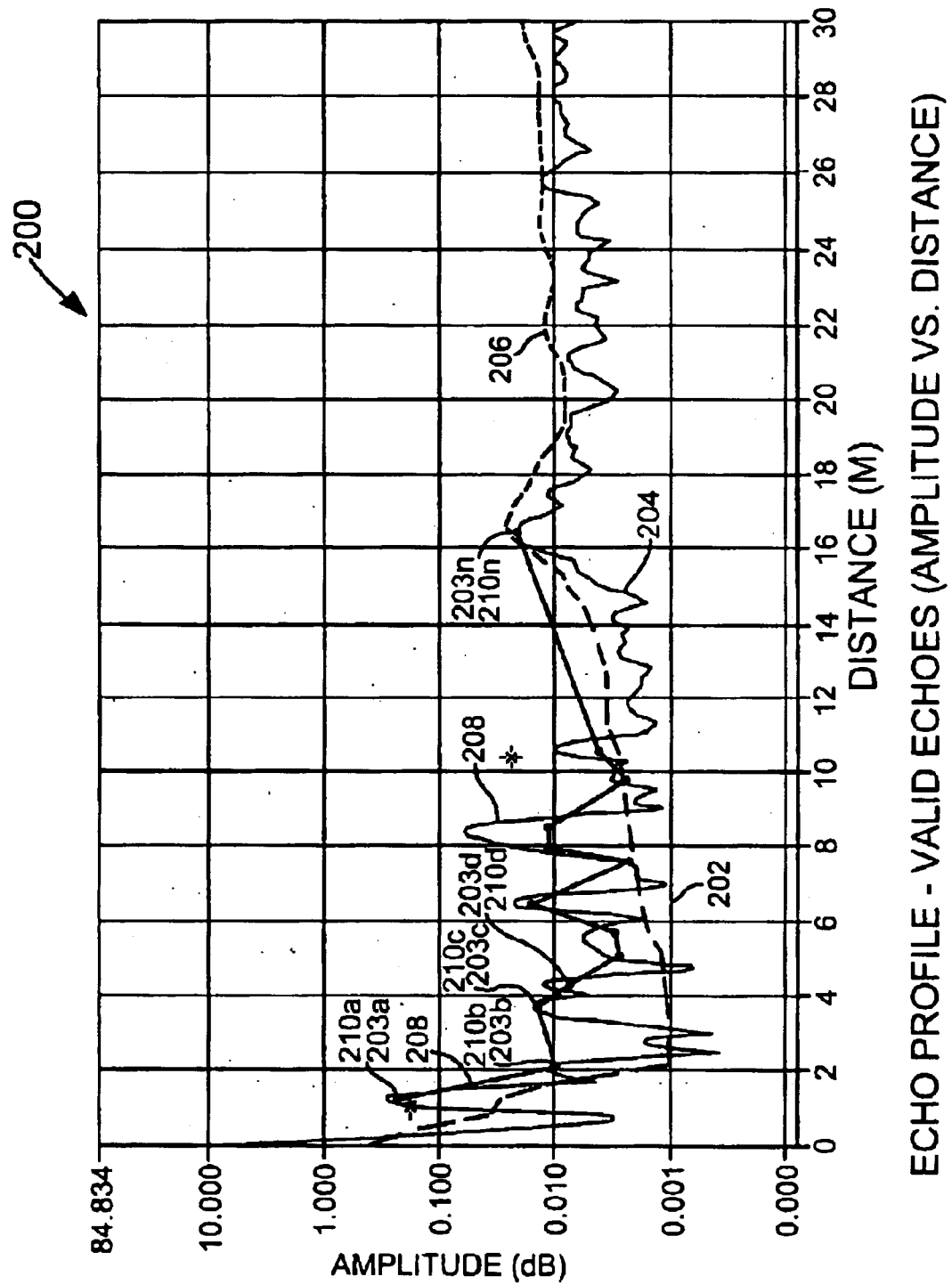
FIG. 3 is an echo profile plot showing a valid echoes waveform determined according to the present invention.

Reference is next made to FIG. 3, which shows the echo profile plot 200 with an echo signal indicated by reference 208. The echo signal 208 represents amplitude of the receive signal in Decibels (dB's) at various distances and is directly related to time. The target, e.g. reflective surface, is represented by a higher amplitude, i.e. a valid echo. The portion of the echo signal 208 below the noise floor level 202 (and the adjusted noise floor level 206) is considered noise and comprises the noise signal 204. The noise signal is unwanted and is generated by various sources in the level measurement system. Valid echoes are indicated by reference 210 and comprise portions of the echo signal 210 that are above the noise floor level 202 (or the adjusted noise floor level 206).

Reference is next made to FIG. 4, which shows in flowchart form a method for generating an adjusted noise floor level, for example of the adjusted noise floor level 206 depicted in the FIGS. 2 and 3. The method for generating and adjusted noise floor level according to this aspect of the invention is indicated generally by reference 400 in FIG. 4.

As shown in FIG. 4, the first step indicated by block 402 involves editing points in the noise floor level (i.e. the noise floor level 202 in FIG. 2). The editing is typically done by a user who enters new values for points in the noise floor level 202. After the user has completed entering the new values, the next step in block 404 involves performing error and boundary checking. If the new values are not valid, then the values are corrected to valid values in block 406. The next operation in block 408 involves retrieving or reading the values for the initial noise floor level 202 from memory. The next operation in block 410 involves comparing the values from the initial noise floor level with the edited values. If there is no change, then the adjusted noise floor level is the same as the initial noise floor level, and the procedure is finished as indicated in block 412. If there is a change in values, then a cubic spline algorithm is applied in block 414. This operation involves entering the new or changed points into a quadratic, i.e. cubic, spline algorithm and generating a line of best fit for all the points, i.e. the changed points and the unchanged points in the initial noise floor level. The line of best fit corresponds to a first version of the adjusted noise floor level. The next operation in block 416 involves sampling the adjusted noise floor level generated in block 414. The adjusted noise floor level is sampled at set intervals, as defined or set in the echo processing module. Using 4000 points, for example, results in an adjusted noise floor level with very good resolution. The last operation in block 418 involves storing in the echo processing library the final version of the adjusted noise floor level determined in block 416. The adjusted noise floor level is made available for future use from the echo processing library which is accessed, for example, by the controller in the level measurement system.

Figure 5B:
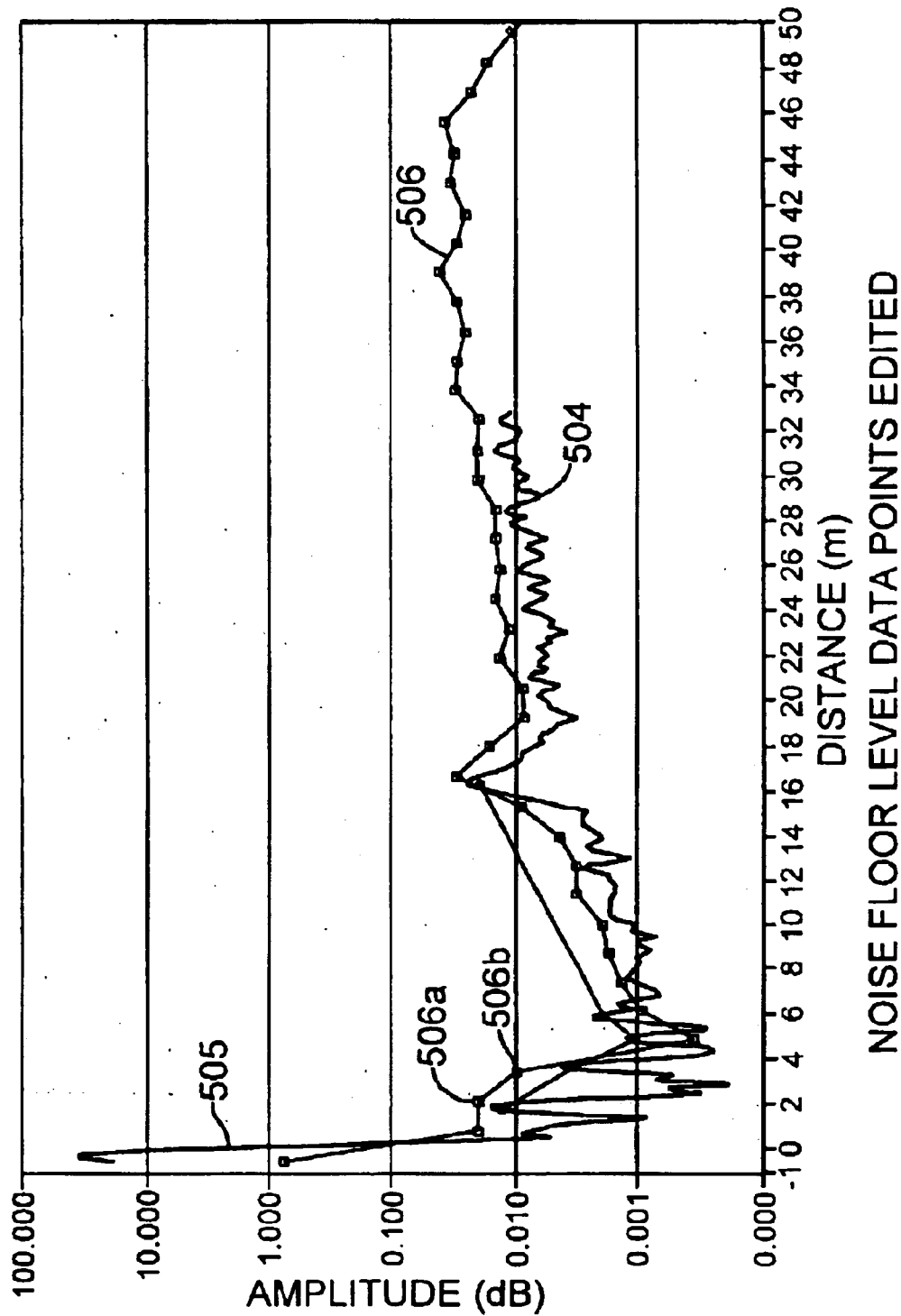
FIG. 5(b) is an echo profile plot showing a revised noise floor level signal in accordance with the present invention.

The operation of the method or procedure for generating the adjusted noise floor level is further illustrated with reference to FIGS. 5(a) and 5(b) FIG. 5(a) shows an echo profile plot 500 with an initial noise floor level 502 having 40 data points. The echo profile plot 500 also shows a noise signal 504, and an echo signal 505. If there are some undesirable peaks in the noise signal 504 or undesirable echo peaks in the echo signal 505, for example, caused by objects interfering with the target, i.e. the reflective surface, then to maintain accuracy in the level measurement system, these peaks are removed by raising the noise floor level 502 and generating a new or adjusted noise floor level in accordance with the present invention. As described above, points in the noise floor level are edited using software components such as LabView, Simatic PDM or other similar products. The noise floor level signal 502 with edited data points is shown in FIG. 5(b) and indicated by reference 506. Specifically, the amplitude, of the third and fourth data points indicated by reference 506a and 506b have been increased to cancel out undesired signal noise in the echo signal 505. As described above, the changed points 506a and 506b are subjected to an error and bound check. Next the new points 506a and 506b are compared with the old values to determine whether any updating needs to be performed. In this case only two points have been changed and therefore not all of the values need to be calculated again. After determining what points need to be updated, the cubic spline algorithm is applied. When the cubic coefficients have been calculated, the noise floor level is sampled to select x number of points, and then the adjusted noise floor level with the new values is stored in memory.

Figure 6:
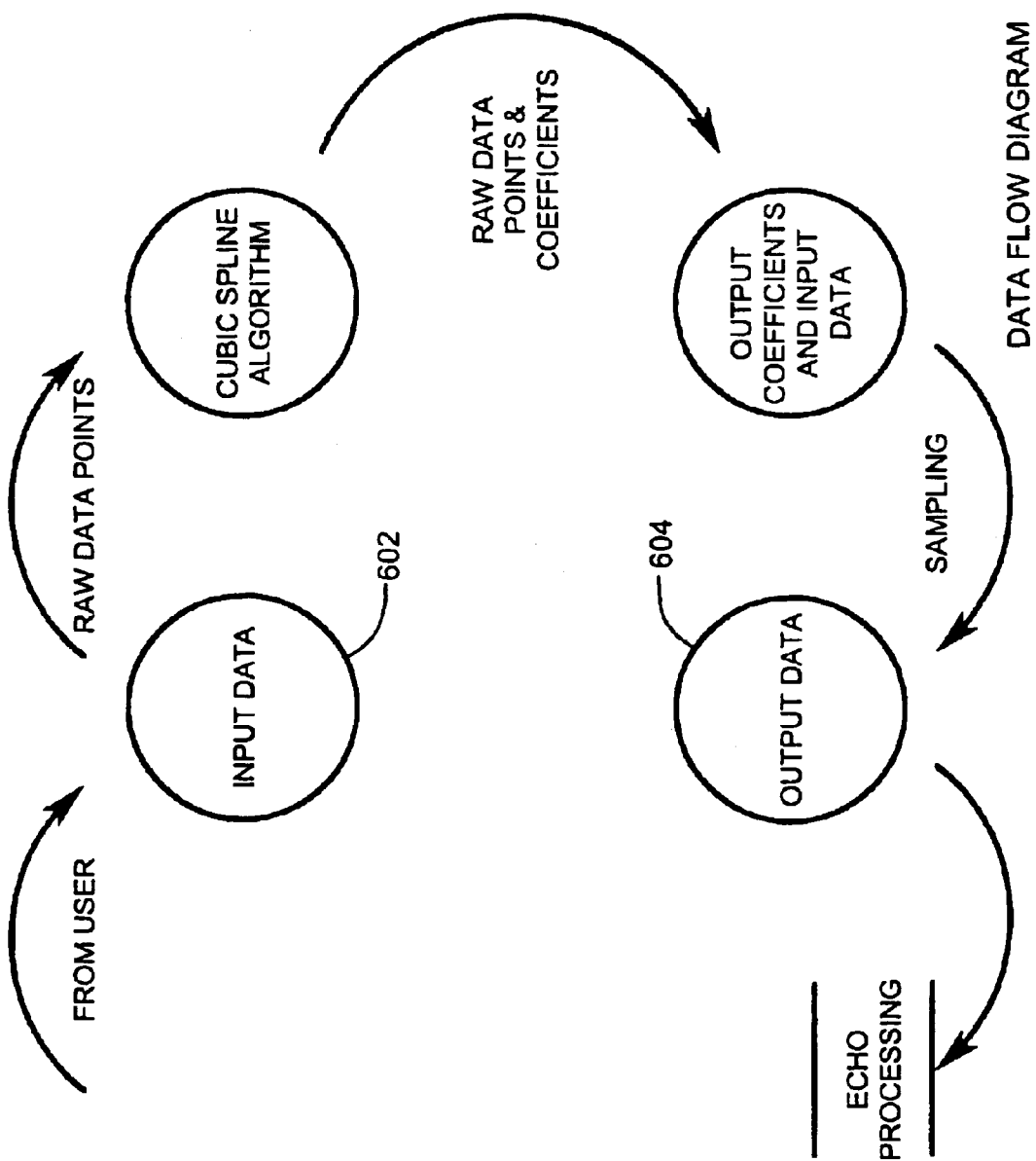
FIG. 6 is a flow diagram showing the data flow for performing echo processing according to the present invention.

There are two main types of data: input data and output data. The input data comprises an array of distances, and their corresponding amplitudes. The output data comprises an array of polynomial coefficients, which matches the input distances and amplitudes. The polynomial coefficients are applied to the cubic spline algorithm to obtain the amplitude associated with a distance. The flow between the input data 602 and the output data 604 is shown in FIG. 6.

Reference is next made to FIGS. 7, 8 and 9. FIG. 7 shows in table form an exemplary input data array. FIG. 8 shows the output coefficient data array generated from input data array through application of the cubic spline algorithm. The output coefficients represent the line between any two points. FIG. 9 shows the resulting output data array.

As described above, after the output data is created, a sampling operation is performed to obtain a specific finite number of points for the adjusted noise floor level. The sampling may be performed at any resolution.

To find the amplitude for a specific distance, the following cubic equation is used:

$$y=ax^3+bx^2+cx+d$$

To choose the appropriate coefficients, the distance x is matched with the appropriate coefficients from the table in FIG. 8. For example, if the distance is 0.9, it is within the bounds of the first equation, i.e. 0.8< distance<2.12, and the coefficients are a=0.3, b=−0.5, c=0.2 and d=0.001. The amplitude value is given as:

$$y=0.3x^3-0.5x^2+0.2x+0.001 \text{ and } x=0.7$$

The final output data is stored in an array which is like the input data array, except there are more points covering the same distance. Exemplary output data with three points for every one distance point is shown in the table of FIG. 9. It will be appreciated that the more points sampled, the greater the precision of the adjusted noise floor level.

A cubic spline algorithm is utilized to generate points for the adjusted noise floor level as described above. The cubic spline algorithm is used to create a series of cubic equations to represent the line of best fit for raw data points. The end result is 'n' finite points which are represented by 'n−1' cubic functions. The n−1 cubic functions are used to select an infinite number of points, and the function $y=ax^3+bx^2+cx+d$ is used to represent the line that is formed between two input points, and the coefficients in particular are determined using this algorithm. This line can then be sampled to obtain any desired number of points to use for the adjusted noise floor level. A pseudo code listing for implementing a cubic spline algorithm is shown below:

Pseudo Code Listing for Cubic Spline Algorithm
© Siemens Militronics Process Instruments Inc: 2002–2003

```
void spline(int n, float x[ ], float y[ ], float b[ ], float c[ ], float
    d[ ])
{
int last, lastm1,ib,l;
float t;
last=n−1;
lastm1=last−1;
if(n<2)
    return;
if(n<3)
    {
    b[0]=(y[1]−y[0]/x[1]−x[0]);
    c[0]=0;
    d[0]=0;
    b[1]=b[0];
    c[1]=0;
    d[1]=0;
    return;
    }
/*
* Set up tridiagonal system
* b=diagonal, d=offdiagonal, c=right hand side.
*/
d[0]=x[1]−x[0];
d[1]=(y[1]−y[0]/d[0]);
for (i=1;1<n;1++)
    {
    d[i]=x[i+1]−x[i];
    b[i]=2.*(d[i−1]+d[1]);
    c[i+1]=(y[i+1]−y[1]/d[i]);
    c[i]=c[i+1]−c[i];
    }
/*
* End conditions. Third derivatives at x[1] and x[n]
* obtained from dividend differences
*/
b[0]=−d[0];
b[last]=−d[lastm 1];
c[0]=0;
c[last]=0.;
if(nl=3)
    {
    c[0]=(c[2]/(x[3]−x[1]))−(c[1]/x[2]−x[0]));
    c[last]=(c[lastm1]/x[last]−x[last−2]))−(c[last−2]/(x[lastm
        1]−x[last−3]));
    c[0]=c[0]*pow(d[0],2)/(x[3]−x[0]);
    c[last]=−c[last]*pow(d[lastm1], 2)/(x[last]−x[last−3]);
    }
/*
*Forward elimination
*/
```

```
for(i=1;i<n;i++)
  {
  t=d[i-1]/b[i-1];
  b[i]=b[i]-t*d[i-1];
  c[i]=c[i]-t*c[i-1];
  }
/*
* Back substitution
*/
c[last]=c[last]/b[last];
for(i=lastm1;i>=0;i--)
  c[i]=(c[i]-d[i]*c[i+1]/b[i]);
/*
* c[i] is now sigma[i] of the text
* compute polynomial coefficients
*/
b[last]=(y[last]-y[lastm1])/d[lastm1]+d[lastm1]*(c[lastm1]+2.*c[last]);
fo(i=0;i<n;i++)
  {
  b[i]=(y[i+1]-y[i]/d[i]-d[i]*(c[i+1]+2.c[i]);
  d[i]=(c[i+1]-c[i]/d[i]);
  c[i]=3.*c[i];
  }
c[n]=3.*c[n];
d[n]=d[n-1];
return:
}
```

Figure 10A:
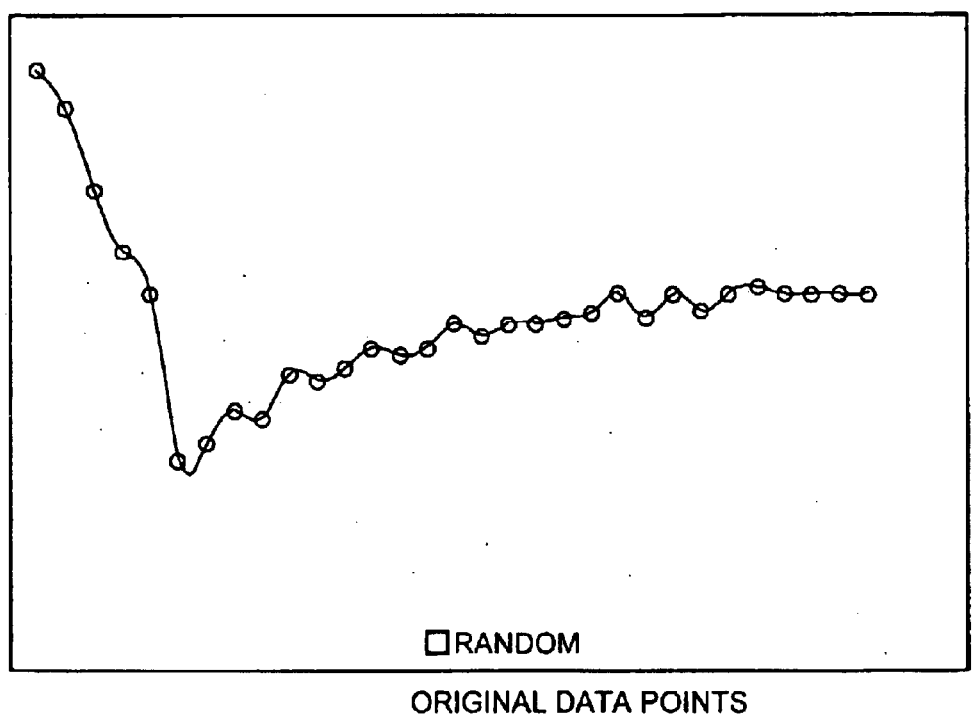
FIG. 10(a) is an echo profile plot showing data points for an exemplary echo profile plot.
Figure 10B:
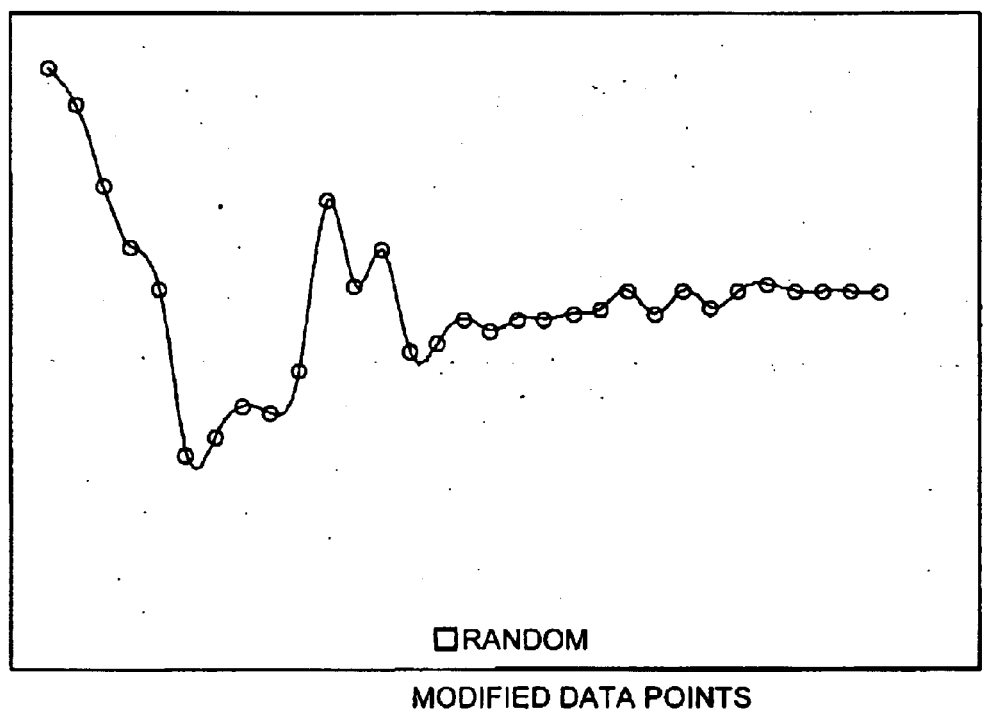
FIG. 10(b) is an echo profile plot showing the data points of FIG. 11(a) modified according to the method of the present invention.

It will be appreciated that cubic splines are smooth functions and when used for interpolation these functions do not have the oscillatory behaviour of high-degree polynomial interpolation. Advantageously, cubic spline functions form a line that intersects every point which is desirable for the subject application. FIG. 10(a) shows an initial noise floor level, i.e. with original data points, and FIG. 10(b) shows an adjusted noise floor level after using a cubic spline algorithm. As shown in FIG. 10(b), the line for the adjusted noise floor level intersects all of the points.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

```
fo(i=0;i<n;i++)
  {
  b[i]=(y[i+1]-y[i]/d[i]-d[i]*(c[i+1]+2.c[i]);
  d[i]=(c[i+1]-c[i]/d[i]);
  c[i]=3.*c[i];
  }
c[n]=3.*c[n];
d[n]=d[n-1];
return:
}
```

It will be appreciated that cubic splines are smooth functions and when used for interpolation these functions do not have the oscillatory behaviour of high-degree polynomial interpolation. Advantageously, cubic spline functions form a line that intersects every point which is desirable for the subject application. FIG. 10(a) shows an initial noise floor level, i.e. with original data points, and FIG. 10(b) shows an adjusted noise floor level after using a cubic spline algorithm. As shown in FIG. 10(b), the line for the adjusted noise floor level intersects all of the points.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for generating an echo profile in a time-of-flight ranging system, said method comprising the steps of:

(a) transmitting a transmit burst of energy to a reflective surface;

(b) receiving reflected pulses from said reflective surface, and converting said reflected pulses into an echo signal;

(c) establishing an initial noise floor level;

(d) identifying one or more portions of said echo signal above said initial noise floor level as having potential echoes;

(e) modifying one or more segments in said initial noise floor level, and generating an adjusted noise floor level;

(f) wherein said step of generating comprises applying a cubic spline procedure to said modified segments and said initial noise floor level;

(g) identifying valid echoes in the portions of said echo signal above said adjusted noise floor level; and (h) generating an echo profile using said identified valid echoes.

2. The method as claimed in claim 1, wherein said step of modifying one or more segments in said initial noise floor level comprises editing data points in said initial noise floor level.

3. The method as claimed in claim 1, further including the step of selecting a plurality of points generated by applying said cubic spline algorithm and said selected points forming said adjusted noise floor level, and said adjusted noise floor level having a resolution based on the number of selected points.

4. A method for generating a noise floor level for an echo profile in a time of flight ranging system, said method comprising the steps of:

(a) establishing an initial noise floor level;

(b) modifying one or more points in said initial noise floor level;

(c) applying a cubic spline algorithm to said modified points and said initial noise floor level to generate a plurality of noise floor data points;

(d) sampling said noise floor data points;

(e) forming an adjusted noise floor level from said sampled noise floor data points.

5. The method as claimed in claim 4, wherein one or more of said points in said initial noise floor level are modified manually using a computer program.

6. The method as claimed in claim 5, wherein said computer program comprises LabView or Simatic PDM.

7. A method for generating an echo profile in a time-of-flight ranging system, said method comprising the steps of:

(a) transmitting a transmit burst of energy to a reflective surface;

(b) receiving reflected pulses from said reflective surface, and converting said reflected pulses into an echo signal;

(c) establishing an initial noise floor level;

(d) subtracting said initial noise floor level from said echo signal to identify one or more potential echoes;

(e) modifying one or more segments in said initial noise floor level, and generating an adjusted noise floor level;

(f) wherein said step of generating comprises applying a cubic spline procedure to said modified segments and said initial noise floor level;

(g) subtracting said adjusted noise floor level from said echo signal to identify one or more valid echoes said echo signal; and (h) generating an echo profile using said identified valid echoes.

* * * * *